United States Patent
Anderson et al.

(10) Patent No.: US 11,849,729 B2
(45) Date of Patent: Dec. 26, 2023

(54) FUNGICIDE TREATMENT FOR FOLIAR DISEASE

(71) Applicant: Rainbow Tree Company, Minnetonka, MN (US)

(72) Inventors: David Lawrence Anderson, Champlin, MN (US); Blake Marie Thilmony, St. Paul, MN (US); Samuel Randall Drahn, St. Paul, MN (US); Patrick Stephen Anderson, Shelby, NC (US)

(73) Assignee: Rainbow Tree Company, Minnetonka, MN (US)

( * ) Notice: Subject to any disclaimer, the term of this patent is extended or adjusted under 35 U.S.C. 154(b) by 0 days.

(21) Appl. No.: 17/534,440

(22) Filed: Nov. 23, 2021

(65) Prior Publication Data

US 2022/0159959 A1    May 26, 2022

Related U.S. Application Data

(60) Provisional application No. 63/117,982, filed on Nov. 24, 2020.

(51) Int. Cl.
  *A01N 43/647* (2006.01)
  *A01P 3/00* (2006.01)
  *A01N 43/653* (2006.01)

(52) U.S. Cl.
  CPC .................. *A01N 43/647* (2013.01)

(58) Field of Classification Search
  CPC ........ A01N 43/647; A01N 43/653; A01P 3/00
  See application file for complete search history.

(56) References Cited

U.S. PATENT DOCUMENTS

2006/0235063 A1* 10/2006 Noon .................. A01N 43/653
                                                          514/383

* cited by examiner

*Primary Examiner* — Trevor Love
(74) *Attorney, Agent, or Firm* — Merchant & Gould P.C.

(57) ABSTRACT

The present disclosure relates to novel and advantageous treatments for foliar disease. Particularly, the present disclosure relates to novel and advantageous treatment compositions and methods for applying such treatment compositions for controlling, treating, or preventing for foliar disease in trees and shrubs. More particularly, the present disclosure relates to novel and advantageous treatment compositions and methods for applying such treatment compositions comprising flutriafol for controlling, treating, or preventing for foliar disease in trees and shrubs wherein the treatment may be done via soil application.

16 Claims, 14 Drawing Sheets

| Treatment | Rate | Application Timing |
|---|---|---|
| RTSA 504 | 2.5 ml | 10/5/2018 |
| RTSA 504 | 5 ml | 10/5/2018 |
| RTSA 504 | 7.5 ml | 10/5/2018 |
| Propiconazole foliar | n/a | 4/17/2018, 5/2/2019, 5/15/2019 |
| Untreated Control | n/a | n/a |

| Treatment | Rate | Application Timing |
|---|---|---|
| RTSA 504 | 2.5 ml | 10/5/2018 |
| RTSA 504 | 5 ml | 10/5/2018 |
| RTSA 504 | 7.5 ml | 10/5/2018 |
| Propiconazole foliar | n/a | 4/17/2018, 5/2/2019, 5/15/2019 |
| Untreated Control | n/a | n/a |

| Treatment | % Apple Scab Tree Canopy Incidence | | | | |
|---|---|---|---|---|---|
| | 5/16/19 | 5/31/19 | 6/11/19 | 6/27/19 | 7/10/19 |
| 1. RTSA 504 2.5 ml | 2.00 ab | 53.33 a | 56.67 a | 65.83 a | 73.33 a |
| 2. RTSA 504 5 ml | 3.50 a | 23.33 bc | 31.67 b | 46.67 b | 50.00 b |
| 3. RTSA 504 7.5 ml | 2.33 ab | 19.17 bc | 25.00 b | 39.17 b | 48.33 b |
| 4. Propiconazole foliar | 1.17 b | 2.33 c | 3.17 c | 8.83 c | 13.00 c |
| 5. Untreated Control | 3.50 a | 31.67 b | 43.33 ab | 67.50 a | 75.83 a |

*Means followed by same letter do not significantly differ (P=.05, Duncan's New MRT).*

Figure 3

| Treatment | % Apple Scab Foliage Severity | | | | |
|---|---|---|---|---|---|
| | 5/16/19 | 5/31/19 | 6/11/19 | 6/27/19 | 7/10/19 |
| 1. RTSA 504 2.5 ml | 1.67 a | 25.83 a | 31.67 a | 43.33 a | 48.33 a |
| 2. RTSA 504 5 ml | 2.33 a | 11.67 bc | 19.17 ab | 38.33 a | 41.67 a |
| 3. RTSA 504 7.5 ml | 1.17 a | 10.00 bc | 13.33 b | 33.33 a | 40.00 a |
| 4. Propiconazole foliar | 1.00 a | 1.33 c | 1.83 c | 8.83 b | 11.00 b |
| 5. Untreated Control | 1.67 a | 19.17 ab | 26.67 a | 41.66 a | 48.33 a |

Figure 4

| Treatment | Average |
|---|---|
| Untreated Control | 45.8 |
| Chlorothalonil | 2.8 |
| RTSA 504 – 5 ml Fall & Spring | 6.2 |
| RTSA 504 – 10 ml Fall & Spring | 2.7 |

| Treatment | n | Avg. DBH (in) 2018 | Avg. scorch severity | Avg. Visual plant health | Avg. Percent Defoliation | Avg. DBH (in) 2021 | Avg. ΔDBH (in) |
|---|---|---|---|---|---|---|---|
| Non-treated | 9 | 8.954505687 | 4.5 | 1.5 | 36.66666667 | 9.433333333 | 0.478827647 |
| Treated | 9 | 11.07174103 | 1.166666667 | 4.777777778 | 1.666666667 | 12.08888889 | 1.017147857 |

| Treatment | Rate | Application Method | Application Timing |
|---|---|---|---|
| 1. 500 g/l Flutriafol (FMC, Philadelphia, PA) | 10 ml/ DBH" delivered in 250 ml solution/ DBH" | Soil Injection | November 23, 2020 |
| 2. 500 g/l Flutriafol | 5 ml/ DBH" delivered in 250 ml solution/ DBH" | Soil Injection | November 23, 2020 & April 6, 2021 |
| 3. 500 g/l Flutriafol | 5 ml/ DBH" delivered in 250 ml solution/ DBH" | Soil Injection | April 6, 2021 |
| 4. 500 g/l Flutriafol | 10 ml/ DBH" delivered in 250 ml solution/ DBH" | Soil Injection | April 6, 2021 |
| 5. 500 g/l Flutriafol | 5 ml/DBH" delivered in 250 ml solution/DBH" | Soil Injection | April 6, 2021 & April 27, 2021 |
| 6. Propiconazole foliar spray | 4 oz/100 gallons | Foliar Spray | April 27, 2021 May 11, 2021 May 25, 2021 |
| 7. Untreated Control | NA | NA | NA |

Figure 11

| Treatment | Rate | Percent Defoliation 8/9/21 | Percent Defoliation 8/18/21 |
|---|---|---|---|
| 500 g/l Flutriafol | 10 ml/ DBH" delivered in 250 ml solution/ DBH" | 5.0 b | 13.0 b |
| 500 g/l Flutriafol | 5 ml/ DBH" delivered in 250 ml solution/ DBH" | 5.0 b | 12.0 b |
| 500 g/l Flutriafol | 5 ml/ DBH" delivered in 250 ml solution/ DBH" | 4.0 b | 8.0 b |
| 500 g/l Flutriafol | 10 ml/ DBH" delivered in 250 ml solution/ DBH" | 1.0 b | 3.0 b |
| 500 g/l Flutriafol | 5 ml/DBH" delivered in 250 ml solution/DBH" | 3.0 b | 7.0 b |
| Propiconazole foliar spray | 4 oz/100 gallons | 21.0 a | 40.0 a |
| Untreated Control | NA | 33.0 a | 50.0 a |

Figure 12

| Treatment | Rate | Application Method | Application Timing |
|---|---|---|---|
| 1. RTSA 504 | 10 ml/ DBH" delivered in 250 ml solution/ DBH" | Soil Injection | Late Fall, 2020 |
| 2. RTSA 504 | 5 ml/ DBH" delivered in 250 ml solution/ DBH" | Soil Injection | Bud break, 2021 |
| 3. RTSA 504 | 10 ml/ DBH" delivered in 250 ml solution/ DBH" | Soil Injection | Bud break, 2021 |
| 4. Orkestra rotated with Torque | 8 oz/100 gal 6 oz/100 gal | Foliar spray | 3, monthly starting at full leaf expansion (May, June, July) |
| 5. RTSA 504 | 10 ml/ DBH" delivered in 250 ml solution/ DBH  5 ml/DBH" delivered in 250 ml solution/DBH" | Soil Injection | Late Fall, 2020  Bud break, 2021 |
| 6. Orkestra rotated with Torque | 8 oz/100 gal 6 oz/100 gal | Foliar Spray | Spring 2021, 3 applications approximately 14-21 days apart beginning at full leaf expansion |
| 7. Untreated Control | NA | NA | NA |

Figure 13

September 9, 2021 Results

| Treatment | n | Avg. Plant Health | Avg. Disease severity | Avg. Defoliation | Avg. number of spots |
|---|---|---|---|---|---|
| F5-6/F5-5 | 4 | 3 | 1.875 | 35 | 11.975 |
| F5-5 | 6 | 4.083333333 | 1.416666667 | 8.333333333 | 14.01666667 |
| F5-5/F5-5 | 4 | 3.125 | 1.875 | 26.25 | 1.15 |
| F10-F | 7 | 3.642857143 | 1.857142857 | 10.71428571 | 33.16571428 |
| F10-F/F5-6 | 6 | 1.833333333 | 1.166666667 | 5 | 17.46666667 |
| F10-5 | 7 | 3.928571429 | 1.142857143 | 5 | 10.17468018 |
| Orkestra rotated with Torque (early) | 5 | 3.5 | 1.8 | 24 | 12.71333333 |
| Orkestra rotated with Torque (late) | 5 | 4.6 | 1 | 5 | 5.725 |
| untreated | 10 | 2.55 | 4.55 | 41 | 57.84444444 |

Figure 14

September 23, 2021 Results

| Treatment | n | Avg. Plant Health | Avg. Disease severity | Avg. Defoliation | Phyto incidence |
|---|---|---|---|---|---|
| F5-6/F5-5 | 4 | 3.25 | 1.875 | 49.375 | 1 |
| F5-5 | 6 | 4.416666667 | 1.75 | 13.33333333 | 0.666666667 |
| F5-5/F5-5 | 4 | 3.75 | 1.125 | 30 | 1 |
| F10-F | 7 | 3.428571429 | 2 | 25.35714286 | 0.428571429 |
| F10-F/F5-6 | 6 | 4.5 | 1.083333333 | 8.333333333 | 0.833333333 |
| F10-5 | 7 | 4.642857143 | 1.428571429 | 6.428571429 | 1 |
| Orkestra rotated with Torque (early) | 5 | 3.4 | 2.2 | 26 | 0 |
| Orkestra rotated with Torque (late) | 5 | 4.6 | 1.1 | 11 | 0 |
| untreated | 10 | 1.6 | 4.65 | 73 | 0.1 |

Figure 15

| Treatment | Rate | Application Method | Application Timing |
|---|---|---|---|
| 1. 500 g/l Flutriafol (FMC, Philadelphia, PA) | 10 ml/ DBH" delivered in 250 ml solution/ DBH" | Soil Injection | November 12, 2020 |
| 2. 500 g/l Flutriafol | 5 ml/ DBH" delivered in 250 ml solution/ DBH" | Soil Injection | November 12, 2020 & April 1, 2021 |
| 3. 500 g/l Flutriafol | 5 ml/DBH" delivered in 250 ml solution/ DBH" | Soil Injection | April 1, 2021 |
| 4. 500 g/l Flutriafol | 10 ml/ DBH" delivered in 250 ml solution/ DBH" | Soil Injection | April 1, 2021 |
| 5. 500 g/l Flutriafol | 5 ml/DBH" delivered in 250 ml solution/DBH" | Soil Injection | April 1, 2021 & April 29, 2021 |
| 6. Myclotect foliar spray (Rainbow Treecare, Minnetonka, MN) | 6 oz/100 gallons | Foliar Spray | April 5, 2021 April 27, 2021 May 18, 2021 |
| 7. Untreated Control | NA | NA | NA |

Figure 18

| Treatment | Rate | Sept 20, 21 | Oct 7, 21 |
|---|---|---|---|
| 500 g/l Flutriafol | 10 ml/ DBH" delivered in 250 ml solution/ DBH" | 19.6 b | 26.0 c |
| 500 g/l Flutriafol | 5 ml/ DBH" delivered in 250 ml solution/ DBH" | 13.0 b | 28.0 c |
| 500 g/l Flutriafol | 5 ml/ DBH" delivered in 250 ml solution/ DBH" | 28.0 b | 36.0 c |
| 500 g/l Flutriafol | 10 ml/ DBH" delivered in 250 ml solution/ DBH" | 22.0 b | 34.0 c |
| 500 g/l Flutriafol | 5 ml/DBH" delivered in 250 ml solution/DBH" | 21.0 b | 36.0 c |
| Myclotect | 4 oz/100 gallons | 15.0 b | 56.0 b |
| Untreated Control | NA | 65.0 a | 84.0 a |

Figure 19

FUNGICIDE TREATMENT FOR FOLIAR DISEASE

CROSS-REFERENCE TO RELATED APPLICATIONS

This application claims the benefit of U.S. Provisional Application No. 63/117,982, filed Nov. 24, 2020, which is hereby incorporated by reference in its entirety.

FIELD OF THE INVENTION

The present disclosure relates to novel and advantageous treatments for foliar disease. Particularly, the present disclosure relates to novel and advantageous treatment compositions and methods for applying such treatment compositions for controlling, treating, or preventing foliar disease in trees and shrubs. More particularly, the present disclosure relates to novel and advantageous treatment compositions and methods for applying such treatment compositions comprising flutriafol for controlling, treating, or preventing foliar disease in trees and shrubs wherein the treatment may be done via soil application.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Foliar tree disease is an issue both because of the disease effects and because of the difficulties in controlling, treating, and/or preventing such disease. Typically protecting foliage of trees is done either by injection of a fungicide into the trees themselves or by spraying the trees with a fungicide. Protecting against foliar disease by injection is a time consuming and laborious process requiring injections into every tree. In addition, injections require holes to be drilled into the tree, which wounds the tree. Injecting trees every year can lead to long term damage to the trees. Protecting against foliar disease by spraying typically requires spraying the tree(s) 3 times per spring. This is commonly done by spraying every 2 weeks in the spring. Not only is spraying labor intensive, care must be taken to account for wind and rain. If weather conditions prevent spraying, treatment timing is thrown off, which impacts the efficacy of the spray, results in fewer trees being treated, and it can create challenges for scheduling labor.

Apple scab, caused by the fungus *Venturia inaequalis*, is an early season leaf disease on susceptible cultivars of crabapple, such as Malus 'Harvest Gold'. Managing apple scab through known fungicide applications is challenging to arborists because of the need to apply 2-3 applications beginning in early spring. Often the applied fungicide loses efficacy due to prolonged periods of cool, moist weather which provide conditions for disease development. Application of a soil applied, systemic product may reduce or eliminate the need for multiple applications through injection or spraying and provide good management of apple scab throughout the growing season.

Evergreen tree farming on nurseries and Christmas tree farms is a multi-million-dollar industry in temperate regions of the United States. Such tree farming provides trees for decoration and live specimens for transplant. In the most recent USDA Census of Agriculture, New York state was ranked seventh in the U.S. for Christmas tree producers (844 farms) and total trees harvested (348,043 trees), with an estimated farmgate and consumer retail value of $8.8 and $14.2 million, respectively. Douglas fir trees are adaptable to various soil conditions, are relatively quick growers, and, over the last 20 years, contributed to the success of the Christmas tree industry in New York. That being said, Douglas-fir trees are susceptible to needle cast diseases. Because of this, and the associated requirements for managing needle cast diseases, some Christmas tree farmers in NY and elsewhere in the Northeast have moved away from Douglas-fir. More specifically, Douglas-fir trees have fallen out of favor due to the perceived need to spray several times in the spring to prevent a needle cast disease. If such needle cast disease could be controlled using a soil applied treatment, it would be beneficial.

Flutriafol is demethylation inhibitor (DMI) fungicide that is part of the triazole group of fungicides. Normal use of flutriafol is to treat soil borne diseases that attack the root systems of plants. For example, flutriafol has been used to treat soil borne diseases that attack the root systems of cotton and grapes.

There is a need in the art for a method of treating foliar disease that can be applied to the soil to work on the foliage of the plant and treat, control, or prevent foliar disease.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

A method of treating, controlling, or preventing foliar disease in trees or shrubs is disclosed, in accordance with one embodiment. The method comprises providing a treatment composition and applying the treatment composition to soil around the plant. Providing the treatment composition comprises providing a treatment composition comprising 0.25 to 5 g ai flutriafol per foot of shrub height or 1.25 to 5 g ai per inch of trunk diameter at breast height The flutriafol is combined with a volume of water to make a unit of treatment composition. Applying the treatment composition may comprise drenching the soil with the treatment composition. Alternatively, applying the treatment composition may comprise injecting the soil with the treatment composition.

A treatment composition for treating, controlling, or preventing foliar disease in trees or shrubs is provided, in accordance with one embodiment. The treatment composition comprises flutriafol and a volume of water, the flutriafol and water forming a unit of treatment composition. The treatment composition is to be applied via soil application.

A method of treating, controlling, or preventing foliar disease in trees or shrubs is provided. The method comprises treating the tree or shrub with a soil application of a flutriafol treatment composition comprising 500 g/l flutriafol. The flutriafol treatment composition is delivered at a rate and is applied as a soil drench or injected into the soil. The rate may be, for example, 5 ml/DBH inch delivered in 250 ml solution/DBH or 10 ml/DBH inch delivered in 250 ml solution/DBH. The flutriafol treatment composition may be delivered in the fall and/or in the spring.

In one embodiment a method of treating, controlling, or preventing foliar disease in trees or shrubs is provided. The method may comprise treating a tree or shrub with 0.25 to 5 g ai flutriafol per foot of shrub height or 1.25 to 5 g ai per inch of trunk diameter at breast height. The flutriafol may be combined with a volume of water to make a unit of treatment composition that can be applied as a soil drench or injected into the soil. In general, the unit of treatment composition is between 50 ml and 1 gallon that is applied per foot of shrub height or inch of trunk diameter at breast height. In various embodiments, the treatment composition, comprising flutriafol and water, may be injected into a tree, applied as a basal trunk spray, applied via drenching, or injected into soil. In alternative embodiments, a flutriafol composition may be applied as a granular treatment without prior mixing of water. In such embodiment, rainwater may provide hydration.

In a further embodiment, a treatment composition for treating, controlling, or preventing foliar disease in trees or shrubs is provided. The treatment composition comprises flutriafol and a volume of water, the flutriafol and water forming a unit of treatment composition, wherein the treatment composition is to be applied via soil application, injected into a tree, or applied as a basal trunk spray. In various embodiments, the treatment composition, comprising flutriafol and water, may be applied injected into a tree, applied as a basal trunk spray, or via drenching. In alternative embodiments, a flutriafol composition may be applied as a granular treatment without prior mixing of water. In such embodiment, rainwater may provide hydration.

The present disclosure, in one or more embodiments, relates to a method of treating, controlling, or preventing foliar disease in trees or shrubs. The method may include forming a flutriafol solution, combining a volume of the flutriafol solution with water to make a unit of treatment composition, and applying one or more units of the treatment composition to a tree or shrub based on size of the tree or shrub, wherein applying is done as a soil application. Forming the flutriafol treatment composition may comprise mixing flutriafol concentrate with water to form a flutriafol solution comprising 0.33 to 100 g/L flutriafol. A unit of treatment composition may be 50 ml to 1 gal. In one embodiment, the flutriafol treatment composition may comprise 80 ml of 500 g/L flutriafol concentrate plus 920 ml water to make a 40 g/L treatment composition. Such treatment composition may be applied at, for example, a rate of 125 ml per inch DBH.

The present disclosure, in one or more embodiments, additionally relates to a treatment composition for treating, controlling, or preventing foliar disease in trees or shrubs. The treatment composition may comprise a volume of a 500 g/L flutriafol concentrate mixed with a volume of water to form a unit of flutriafol treatment composition. The treatment composition is to be applied via soil application While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 3 illustrates the percentage of apple scab whole tree canopy incidence in the trial of FIG. 1;

FIG. 4 illustrates the percentage of apple scab foliage severity in the trial of FIG. 3;

FIG. 11 illustrates treatment, rate, application method, and application timing in accordance with a trial evaluating different rates and timings on the control of foliar disease;

FIG. 12 is a table showing results of an evaluation of the trial of FIG. 11;

FIG. 13 is a table showing treatment, rate, application method, and application timing;

FIG. 14 is a table with a first set of results from the trial of FIG. 13;

FIG. 15 is a table with a second set of results from the trial of FIG. 13;

FIG. 18 is a table showing treatment, rate, application method, and application timing of a trial for treating apple scab on crabapple trees;

FIG. 19 is a table with results from the study of FIG. 18.

DETAILED DESCRIPTION

Figures 1, 2:
FIG. 1 illustrates treatment, rate, and application timing in a trial evaluating treatment of apple scab.
FIG. 2 is a photograph showing the visual appearance of apple scab.

The present disclosure relates to novel and advantageous treatments for foliar disease. Particularly, the present disclosure relates to novel and advantageous treatment compositions and methods for applying such treatment compositions for controlling, treating, or preventing for foliar disease in trees and shrubs. More particularly, the present disclosure relates to novel and advantageous treatment compositions and methods for applying such treatment compositions comprising a flutriafol solution for controlling, treating, or preventing for foliar disease in trees and shrubs wherein the treatment may be done via soil application.

In accordance with methods described herein, foliar disease may be controlled, prevented, and/or treated in a variety of tree and shrub species using a soil application of a treatment composition. The tree and shrub species that may be treated may include, for example, boxwood shrubs, cherry trees, crab apple trees, dogwood trees, Douglas-fir trees, hawthorn trees, lilac shrubs, magnolia trees, oak trees, palm trees, pine trees, privet, roses, spruce trees, sycamore trees, and viburnum. More specifically, treatments described herein may be used to control foliar pathogens, such as treat, control, or prevent anthracnose (ash, dogwood, oak, sycamore), apple scab, boxwood blight, burr oak blight, rust (such as cedar apple rust and pear trellis rust), *cercospora*, cherry leaf spot, cherry leaf blight, diamond scale (palms), *diplodia, dothistroma, entomosporium* leaf spot, powdery mildew, needle cast (including Swiss needle cast, *rhabdocline* needle cast, and *rhizospharea* needle cast), *psuedocerospora, septoria* leaf spot, and *stigmina*, using soil application.

Flutriafol is a systemic triazole fungicide. More specifically, flutriafol is a systemic demethylation inhibitor (DMI) fungicide. The systems and methods used herein incorporate flutriafol into a treatment composition for treating, controlling, and/or preventing foliar disease in trees and shrubs. Such treatment composition may be soil applied.

In accordance with one embodiment, a treatment composition including flutriafol is applied to trees or shrubs in the fall and/or in the spring. In general, fall treatments may be timed to occur in late fall (October-November) prior to ground freeze and spring treatments may be timed to occur as soon as the ground thaws or at bud break. Application may be soil application and the amount applied, also referred to herein as dosage, may be based on tree or shrub size and, in some embodiments, tree or shrub species. In general, dosage for shrubs may be 0.5 to 1.0 g flutriafol/ft of shrub height.

The dosage may vary based on the time of year the treatment composition is being applied. For example, one dosage per trunk diameter or foot of shrub height may be called for in the spring and another dosage per trunk diameter or foot of shrub height may be called for in the fall. In general, a single total dosage amount may be split be done in the fall, in the spring, or split between the fall and the spring. For example, the total dosage amount may be split in half with half being applied in the fall and half being applied in the spring. The dosage may be split such that a larger amount is applied in the fall and a smaller amount is applied in the spring. Alternatively, the dosage may be split such that a larger amount is applied in the spring and a smaller amount is applied in the fall. The disclosed composition works to protect the foliage of trees and shrubs and may be particularly useful for treating established (i.e., not annual) trees and shrubs.

In one embodiment, the treatment composition comprises flutriafol mixed into water. The dosage of treatment composition that is applied may comprise a certain amount of flutriafol per inch of trunk diameter or foot of shrub height. In general, the treatment composition may be applied at a volume per inch of trunk diameter or foot of shrub height. In one embodiment, the volume is 250 ml. In other embodiments, the volume may range from about 50 ml to up to about 1 gallon. In some embodiments, other ingredients may be added to the treatment composition, such as adjuvants, insecticides, fungicides, soil amendments, biostimulants, microbial treatments, growth regulators, and fertilizers.

The treatment composition thus may comprise 0.25 to 5 grams flutriafol active ingredient (g ai) in a volume of water. The volume of water may range, for example, between 50 ml and 1 gallon. In some embodiment, the volume of water is 125 or 250 ml of water. The treatment composition may be made by adding flutriafol, for example a flutriafol concentrate solution, to water. For example, a flutriafol concentrate may comprise 500 g flutriafol/L. For a dosage of 2.5 grams flutriafol per inch of trunk diameter, the amount of flutriafol concentrate is 5 ml/DBH inch. For a desired total volume of treatment composition of 125 ml, the treatment composition is made by combining 5 ml of the 500 g/L solution (or liquid concentrate formulation of flutriafol) with 120 ml water to make 125 ml of treatment composition. This treatment composition is then multiplied by the inches of tree diameter or feet of shrub height. It is to be appreciated that other manners of forming the treatment composition may be used.

In one embodiment a method of treating, controlling, or preventing foliar disease in trees or shrubs is provided. The method may comprise treating a tree or shrub with 0.25 to 5 g ai flutriafol per foot of shrub height or 1.25 to 5 g ai flutriafol per inch of trunk diameter at breast height. The flutriafol may be combined with a volume of water to make a unit of treatment composition that can be applied as a soil drench or injected into the soil. In general, the unit of treatment composition is between 50 ml and 1 gallon that is applied per foot of shrub height or inch of trunk diameter at breast height.

In one embodiment, a suitable dosage for controlling, preventing, treating foliar disease of trees is 5 grams of flutriafol active ingredient per inch of trunk diameter or foot of shrub height. Based on a 500 g/L flutriafol concentrate, this equates to 10 ml of solution per inch of trunk diameter. The 10 ml of flutriafol concentrate is mixed with 240 ml water per inch of diameter of trunk. The dosage may vary, for example, between 0.25 to 5 grams of flutriafol active ingredient (generally between 0.5 ml and 10 ml of flutriafol of a 500 g/L formulation) mixed with between 25 ml to 1 gallon of water per inch of tree diameter or foot of shrub height. The amount of water used may vary considerably based on the type of application—for example, applying via soil drench may take a larger volume than applying via soil injection. In some embodiments, treatment may comprise applying between 25 ml and 1 gallon (3785 ml) of treatment composition per inch of diameter of trunk or foot of shrub height. In other embodiments, treatment may comprise applying between 150 ml and 750 ml water per inch of diameter of trunk or foot of shrub height. More specifically, the dosage may be 0.25 g ai, 2.5 g ai, 3.75 g ai, 5 g ai or something in between, of flutriafol mixed with water per inch of diameter of trunk at DBH (diameter at breast height). DBH refers to the tree diameter measured at 4.5 feet above the ground.

In another embodiment, a suitable dosage for controlling, preventing, or treating foliar disease of shrubs is 5 ml of flutriafol 500 g/L flutriafol concentrate (2.5 g flutriafol ai) mixed with 245 ml water per foot of shrub height. The dosage may vary, for example, between 0.5 ml and 10 ml of flutriafol 500 g/L formulation (0.25 g ai and 5 g ai respectively) mixed with 50 ml, 750 ml or up to one gallon of water per foot of shrub height. More specifically, the dosage may be 0.5 ml, 5 ml, 7.5 ml, 10 ml or something in between of flutriafol of a 500 g/L formulation (0.25, 2.5, 3.75, and 5 g ai flutriafol) mixed with water per foot of shrub height.

In accordance with treatment methods disclosed herein, the treatment composition may be applied to trees and shrubs via soil application. Soil application may be done in any suitable manner. For example, soil application may be done using a motorized backpack sprayer and soil injector, such as an HTI 2000. In situations where soil injection is not available, soil application may be done by drenching the soil around the base of trunk. For example, soil application may be done via drenching by digging a trench at the base of each tree for example and pouring a solution volume into the trench. In one embodiment, the total solution volume poured into the trench may be 750 ml/DBH inch of tree diameter. In some embodiments, application may be done via a granular treatment, injection into a tree, or a basal trunk spray. A basal trunk spray may comprise, for example, spraying the lower 5 feet of a tree trunk with the treatment composition. A granular treatment may use flutriafol without prior mixing of water. In such embodiment, rainwater may provide hydration.

A series of tests were run to test the efficacy of a soil-applied treatment composition including the fungicide flutriafol for treating a plurality of foliar diseases. These tests are described below.

Apple Scab

A trial was performed looking at efficacy of the disclosed treatment against apple scab. More specifically, the trial evaluated various concentrations of the treatment disclosed herein for the management of apple scab, *Venturia inaequalis*, and to improve the overall health of crabapple trees, Malus sp. The trial was performed at the Davey Tree Nursery in Wooseter Ohio.

The trial was initiated using 8-foot tall (3.5 to 7-inch DBH) Harvest Gold crabapple trees (Malus 'Harvest Gold'). The trees were planted in 2010 in a row with twenty-foot centers. Each treatment was replicated seven times in a randomized complete block design. All soil injection treatments were performed on Oct. 5, 2018 and the trial was evaluated through fall of 2019.

The study used a commercially available fungicide, referred to herein as RTSA 504, comprising 500 g/L flutriafol at 42% by weight flutriafol. The RTSA 504 was combined with water to form a treatment composition, as discussed above. The treatment composition was applied via a soil application and compared results with treatment using foliar applied propiconazole and against an untreated control. The treatment composition was formed at 2.5, 5, or 7.5 ml/DBH inch mixed with water.

FIG. 1 illustrates treatment, rate, and application timing of the trial looking at efficacy for treatment of apple scab. The rates of "2.5 ml," "5 ml," and "7.5 ml" indicate the amount of the commercial formulation of flutriafol used per 247.5, 245, and 242.5 ml water respectively to form each 250 ml batch of treatment composition. As shown, application of RTSA 504 was done in fall of 2018. Soil application of the RTSA 504 was done via backpack sprayer and HTI 2000 soil injector.

Two dosages of propiconazole were performed via foliar spray treatments. The dosages were performed in May 2019, corresponding with budbreak. All foliar spray treatments were combined with Audible 90, a non-ionic surfactant, at label rates. Foliar spray treatment was done via backpack sprayer and JD9 spray gun. Data was analyzed using ARM statistical software, Gyrling Systems, Atlanta. Anova and means were separated using Duncan's New MRT @ 0.05.

The following evaluation ratings were made to evaluate percentage of whole tree canopy affected and percentage of foliage affected by apple scab. The percentage of the whole tree canopy affected by apple scab incidence were visually rated, 0% having the least amount of the whole tree affected and 100% having the most amount of the whole tree affected. FIG. 2 shows the visual appearance of apple scab. The percentage of foliage affected by apple scab severity were visually rated, 0% having the least amount of foliage severity and 100% having the most amount of foliage severity. Four terminals at random were inspected to determine an average foliar rating.

No phytotoxicity was observed throughout the duration of the trial.

FIG. 3 illustrates the percentage of apple scab whole tree canopy incidence in this study. The trial revealed that RTSA 504 5 ml and RTSA 504 7.5 ml had significantly lower percentage of apple scab tree canopy incidence compared to the untreated control on Jun. 27, 2019 and Jul. 10, 2019

FIG. 4 illustrates the percentage of apple scab foliage severity in this study. The trial revealed RTSA 504 5 ml and RTSA 504 7.5 ml had significantly lower percentage of apple scab tree canopy incidence compared to the untreated control on Jun. 27, 2019 and Jul. 10, 2019. RTSA 504 7.5 ml treatment had significantly lower percentage of apple scab foliage severity at Jun. 11, 2019.

Cherry Leaf Spot

A trial was performed looking at efficacy of the disclosed treatment against cherry leaf spot. In this trial, a commercially available fungicide having an active ingredient flutriafol at 500 g/L, referred to herein as Topguard, RTSA 504, or Flutriafol, was tested for efficacy in preventing or treating cherry leaf spot. Topguard is labeled for cotton and a special exemption label exists for grapes in Texas for cotton root rot caused by *Phymatotrichopsis omnivore*.

Forty-nine *Prunus×yedoensis* 'Yoshino' of similar age and size were selected for this study. Topguard treatments were applied with a soil injector. Specifically, the trial used an HTI 2000 Soil Injector with backpack where 250 ml of treatment composition was injected into the soil for every inch of DBH.

The following rates of Flutriafol were used: 2.5, 5, and 10 ml/in DBH. All treatments were applied in the fall except for one 5 ml/in treatment that was applied in the spring. Fall treatments were applied on November 5 and the spring treatment was applied on February 10.

The industry standard fungicide treatment used was Orkestra @ 8 oz/100 gal with spreader/sticker, and was applied on Mar. 16, 2020, Mar. 25, 2020, Apr. 7, 2020, Apr. 21, 2020, and May 5, 2020. At the Mar. 16, 2020 application only a few cherries had broken bud. By 3/25/20, 90% of buds on all Orkestra treated trees had opened. The untreated control was not treated.

Figure 5:
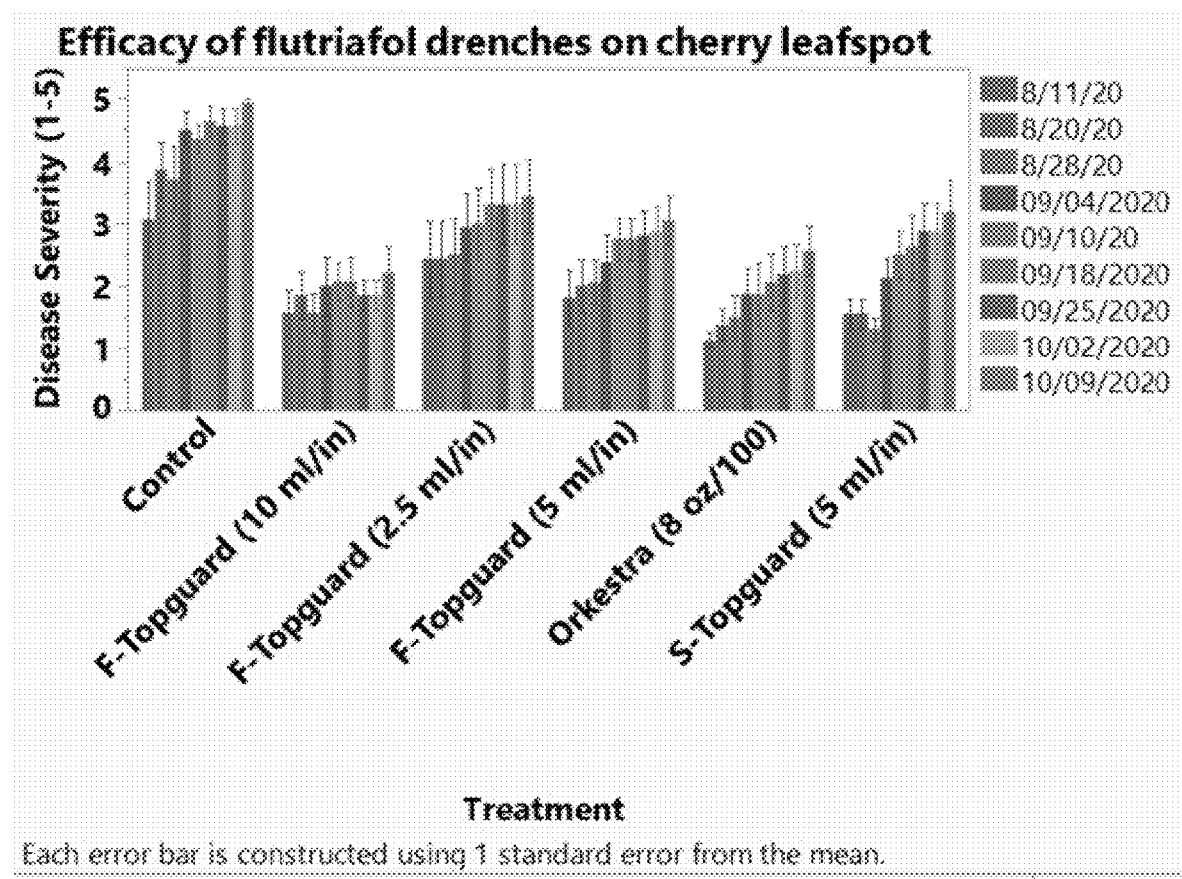
FIG. 5 illustrates the efficacy of flutriafol drenches on cherry leafspot using a severity rating.

In mid to late summer of 2020 trees were rated on a disease severity rating scale where 1 is <10% canopy symptomatic, 2 is 10-25% canopy symptomatic, 3 is 25-50 canopy symptomatic, 4 is 50-75% canopy symptomatic and 5 is >75% canopy symptomatic. FIG. 5 illustrates the efficacy of flutriafol soil injection treatments on cherry leafspot in the trial using such severity rating. As shown, the control group had substantially higher disease severity than the trial groups. Means were compared with a simple ANOVA and Wilcoxon test.

Figure 6:
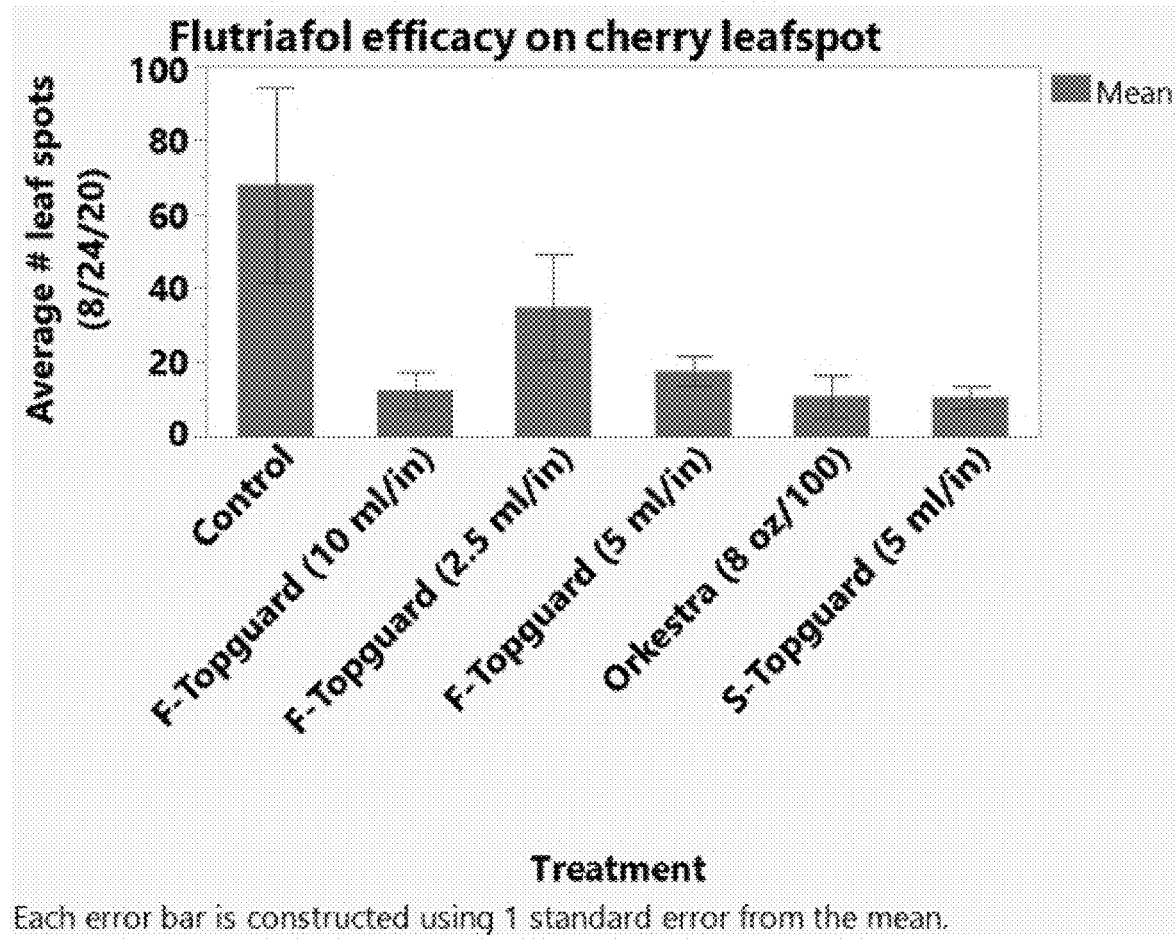
FIG. 6 illustrates efficacy of flutriafol drenches on cherry leafspot using average number of leafspots.

Leafspots were counted from 20 representative leaves of each tree. FIG. 6 illustrates efficacy of flutriafol soil injection treatments on cherry leafspot using average number of leafspots. As shown, the control group had substantially higher leafspots than the trial groups. ANOVA and Tukey's HSD were performed to compare means across treatments.

Swiss Needle Cast

A trial was performed looking at efficacy of the disclosed treatment management of Swiss needle cast (*Phaeocryptopus gaumannii*) on Douglas-fir (*Pseudotsuga menziesii*). The trial was performed by Cornell University on a tree farm in Springwater, NY. Three blocks of 4 trees were delineated.

The trial comprised 12 Douglas-fir trees that were exhibiting symptoms and fruiting bodies of the Swiss needle cast fungus *Phaeocryptopus gaumannii*. The treatments within the blocks were: an untreated control, Chlorothalonil as a standard foliar fungicide treatment, and two rates of a soil-applied fungicide treatment composition in accordance with the treatment and flutriafol composition disclosed herein. The soil or root applied fungicide treatments were made in the fall of 2018 and spring of 2019. The Chlorothalonil foliar application treatment was made in the spring of 2019.

Analysis was made of, and ratings were given for, four samples taken from the perimeter of each study tree at approximately one meter in height. The samples were taken when the fungal fruiting bodies would be visible on the previous season's growth: May of 2020. Samples were examined and rated in a lab using a dissecting microscope.

Samples were collected and assessments are made in early spring (approximately 11 months after the last treatment was made). Rating method supplied by Gary Chastagner, 2014.

Figures 7, 8:
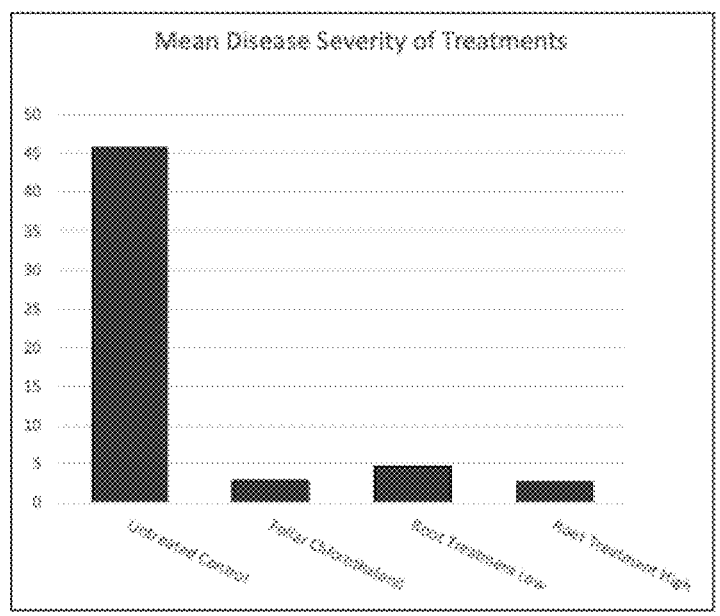
FIG. 7 illustrates results of a trial evaluating treatment of Swiss Needle cast.
FIG. 8 illustrates pseudothecia density.

Results of the study evaluating treatment of Swiss needle cast are shown in FIG. 7. Incidence: (% Needles on a shoot that are infected) of Swiss Needle Cast (SNC) pseudothecia on needles is rated on a simple 0-10 scale where 0=none, 1=1 to 10%, 2=11 to 20%, 3=21 to 30%, 4=31 to 40%, 5=41 to 50%, 6=51 to 60%, 7=61-70%, 8=71 to 80%, 9=81 to 90%, and 10=91 to 100% of the needles on the sample have pseudothecia.

Pseudothecia Density (of those needles that are infected how much of the needle's area is encompassed by pseudothecia) is shown in FIG. 8. More specifically, FIG. 8 illustrates a graph of FIG. 7. Severity Index: Product of above two ratings. Analysis of variance was completed on Severity index.

A shoot severity rating is calculated based on the % of the area of the needle that is covered in pseudothecia. As shown, the incidence of needle cast for Flutriafol treated trees was dramatically less than that of the untreated control trees.

The study demonstrated that Douglas fir can be grown successfully with fewer sprays and with a fungicide that has lower environmental impact. More specifically, the results showed that soil applied treatments in accordance with the treatment disclosed herein are comparable to the industry standard foliar fungicide treatment.

Sycamore Anthracnose

A trial was performed looking at efficacy of the disclosed treatment for management of Sycamore anthracnose. The trial was performed at Brevard, North Carolina.

The trial used established London plane trees with a previous history of anthracnose infections. The study evaluated treatment with 500 g/l Flutriafol concentrate. The trees were treated in October 2018 with either water or a Flutriafol concentrate at a rate of 10 ml/inch diameter measured at breast height (DBH). The treatment were injected 3 inches into the soil around the base of the trees using a soil injector. The soil injector used for the study was an HTI 2000 soil injector from Rainbow Treecare, Minnetonka, MN The Flutriafol concentrate was diluted 11:1 water:concentrate.

Trees were rated in spring 2019 and spring 2021. The trees were rated on a sycamore anthracnose disease severity rating scale wherein 1 is <10% canopy symptomatic, 2 is 10-25% canopy symptomatic, 3 is 25-50 canopy symptomatic, 4 is 50-75% canopy symptomatic and 5 is >75% canopy symptomatic.

Results: There were no visual differences in 2019. The trees were not inspected in 2020. In 2021, the trees were inspected and rated for leaf scorch symptoms because there were clear differences. In 2021, the site was rated visually and the DBH was measured on every tree. Trees that were treated all were extremely vigorous and healthy, while the non-treated trees were scorched and did not appear as vigorous based on DBH measurements.

Figures 9, 10:
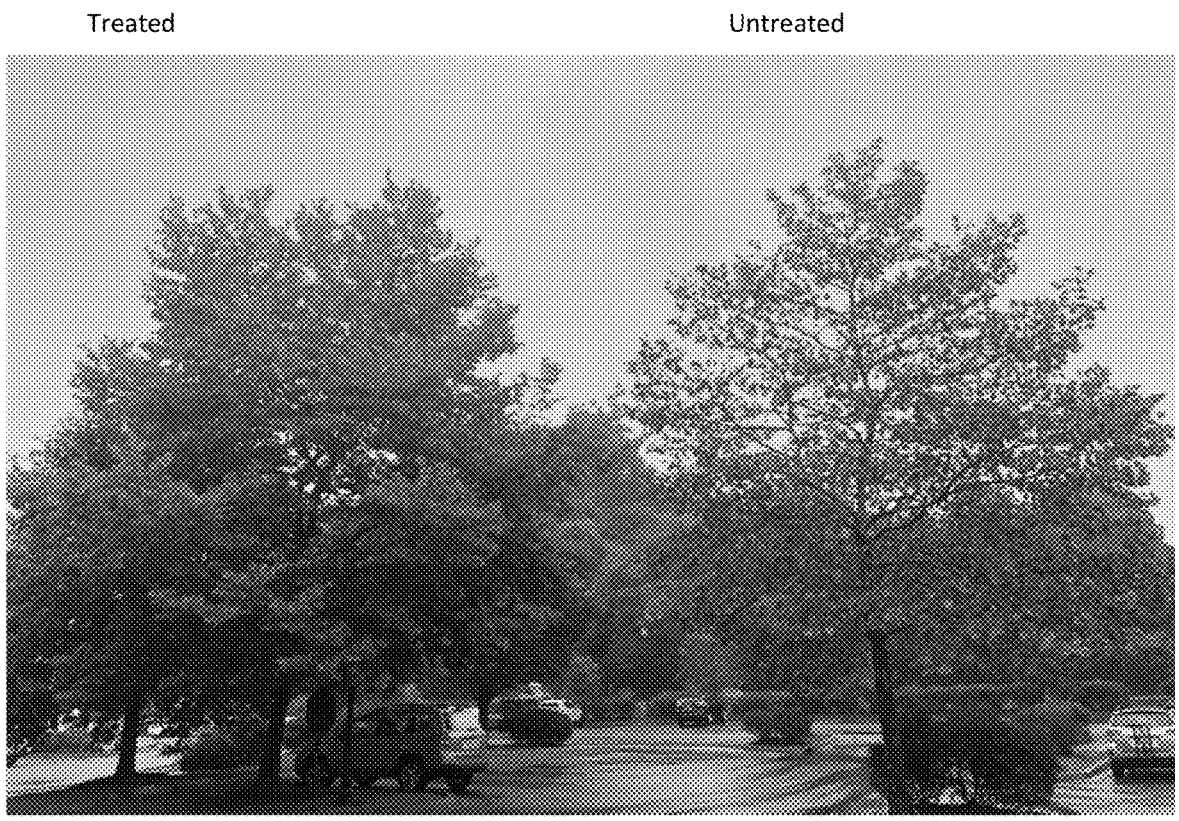
FIG. 9 is a table of the results of a study evaluating treatment of sycamore anthracnose.
FIG. 10 is a photograph of a tree treated with the treatment composition of FIG. 9 and a tree that was not treated.

FIG. 9 is a table of the results. As shown, the average scorch severity of treated trees was 1.1667 while the average scorch severity of non-treated trees was 4.5. The average visual plant health score of treated trees was 4.778 while the average visual plant health score of non-treated trees was 1.5. The average percent defoliation of treated trees was 1.667 while the average percent defoliation of non-treated trees was 36.667. The average change in diameter at breast height for treated trees was 1.017 inches while the average change in diameter at breast height for non-treated trees was 0.479 inches. In all assessed parameters, the treated trees performed better than the non-treated trees.

FIG. 10 is a photograph showing a tree treated with flutriafol (left) in accordance with the disclosure herein and an untreated tree (right).

Assessing and Comparing Rates & Timings—Cherry Leaf Spot

Study 1

A trial was performed looking at rates and timings of the disclosed flutriafol treatment composition to treat cherry leaf spot on cherry trees. This trial evaluated and compared fall applications of three rates of flutriafol against industry standard foliar treatments for control of cherry leaf spot on cherry trees. The trees treated comprised *Prunus* spp. *Montemorency*. The pathogen being controlled was cherry leaf spot (*Blumeriella jaapii*). The trial was done at Michigan Ag Research Station in Albion, Michigan starting in the Fall of 2020 and ending in September 2021.

The trial had a randomized design with five replicates per treatment. Each treatment was identified and marked with an ID tag. At least 5 replicates per variety with known documented and prior levels of cherry leaf spot evenly distributed amongst study trees. In addition, susceptible trees or branches were optionally artificially inoculated with the pathogen.

Soil application was done using a motorized backpack sprayer and soil injector. The motorized backpack sprayer was from Maruyama, Tokyo, Japan. The soil injector was an HTI 2000 soil injector from Rainbow Treecare, Minnetonka, MN.

Foliar application was done using a foliar spray via a motorized backpack sprayer and spray gun. The backpack sprayer was form Maruyuma, Tokyo, Japan. The spray gun was an MD-9 spray gun from Maruyama, Tokyo, Japan.

Foliar sprays via motorized backpack sprayer and JD-9 spray gun or equivalent pressurized spray system were performed.

Fall treatments were done in late fall (October-November) prior to ground freeze. Early spring treatments occurred as soon as ground thaw occurred (first soil treatments may coincide with first spray treatments).

Insecticide treatments were applied to all tree replicates as needed to maintain tree health and prevent foliar feeding damage from insects, such as Japanese beetles, that could compromise the trial's integrity.

FIG. 11 is a table showing treatment, rate, application method, and application timing for the trial assessing rates and timings of the disclosed flutriafol treatment composition to treat cherry leaf spot on cherry trees. As shown, treatment included flutriafol soil injection and propiconazole foliar spray. Additionally, an untreated control was assessed.

Flutriafol soil injection was done using 500 g/l flutriafol at a rate of (1) 10 ml/DBH inch delivered in a 250 ml solution/DBH inch, and (2) 5 ml/DBH inch delivered in a 250 ml solution/DBH inch. For one grouping, each of these rates was applied in spring (April) 2021. For one grouping, the first treatment rate (10 ml/DBH inch) was applied in the fall (November) of 2020. For one grouping, the second rate (5 ml/DBH inch) was applied in both the fall (November)

2020 and the spring (April) 2021. For one grouping, the second rate (5 ml/DBH inch) was applied twice in the spring (April) of 2021.

An evaluation was made 2 weeks after treatment ("WAT") to assess potential phytotoxicity symptoms of leaves present. Percent defoliation was evaluated on two dates in August to evaluate disease presence and progression in trees. FIG. 12 is a table showing results of the evaluation. As shown, the percent defoliation at both evaluation dates for all rates and applications of flutriafol treatment was significantly less than that of trees treated with propiconazole foliar spray and untreated control trees.

Study 2

A trial was performed looking at rates of the disclosed flutriafol treatment composition to treat cherry leaf spot on cherry trees. This trial evaluated and compared fall applications of three rates of flutriafol against industry standard foliar treatments for control of cherry leaf spot on cherry trees. The trees treated comprised *Prunus* spp. *Montemorency*. The pathogen being controlled was cherry leaf spot (*Blumeriella jaapii*). The trial was done in Charlotte, North Carolina starting in the Fall of 2020 and ending in September 2021.

The trial had a randomized design with five replicates per treatment. Each treatment was identified and marked with an ID tag. At least 5 replicates per variety with known documented and prior levels of cherry leaf spot evenly distributed amongst study trees. In addition, susceptible trees or branches were optionally artificially inoculated with the pathogen.

Soil application was done using a motorized backpack sprayer and soil injector. The motorized backpack sprayer was from Maruyama, Toyko, Japan. The soil injector was an HTI 2000 soil injector from Rainbow Treecare, Minnetonka, MN.

Foliar application was done using a foliar spray via a motorized backpack sprayer and spray gun. The backpack sprayer was form Maruyuma, Tokyo, Japan. The spray gun was an MD-9 spray gun from Maruyama, Tokyo, Japan.

Foliar sprays via motorized backpack sprayer and JD-9 spray gun or equivalent pressurized spray system were performed.

Fall treatments were done in late fall (October-November) prior to ground freeze. Early spring treatments occurred as soon as ground thaw occurred (first soil treatments may coincide with first spray treatments).

Insecticide treatments were applied to all tree replicates as needed to maintain tree health and prevent foliar feeding damage from insects, such as Japanese beetles, that could compromise the trial's integrity.

FIG. 13 is a table showing treatment, rate, application method, and application timing for the trial performed looking at rates of the disclosed flutriafol treatment composition to treat cherry leaf spot on cherry trees. As shown, treatment included flutriafol soil injection and orchestra rotated with Torque foliar spray. Additionally, an untreated control was assessed.

Flutriafol (here referred to as RTSA 504) soil injection was done using 500 g/l flutriafol at a rate of (1) 10 ml/DBH inch delivered in a 250 ml solution/DBH inch, and (2) 5 ml/DBH inch delivered in a 250 ml solution/DBH inch. For one grouping, the first rate (10 ml/DBH inch) was applied in late fall 2020. For one grouping, the second rate (5 ml/DBH) was applied in spring 2021 at bud break. For one grouping, the first rate (10 ml/DBH) was applied in the spring 2021 at bud break. For another grouping, the first rate (10 ml/DBH) was applied in late fall 2020 and the second rate (5 ml/DBH) was applied in spring 2021 at bud break.

An evaluation was made 2 WAT to assess potential phytotoxicity symptoms if leaves are present. Quality and phytotoxicity ratings and total estimated percentage of leaf drop were made in June, July, August, and September of 2020 to evaluate disease presence and progression in the trees. Statistical analyses were conducted using R. A one-way and two-way ANOVA was used to evaluate the effect of treatment and time on quality ratings in the trees.

FIG. 14 is a table with results from Sep. 9, 2021. FIG. 15 is a table with results from Sep. 23, 2021. The following Quality Rating Scale was used:

0—No symptoms
1—Slight; less than 5% of foliage affected; No impact on aesthetics.
2—Moderate; 5-20% affected; some yellowing; little to no defoliation; light to moderate effect on aesthetics.
3—Extensive; 20-50% affected; significant defoliation; leaf yellowing; significant effect on aesthetics.
4—Heavy; 50-80% affected; severe defoliation and discoloration; severe negative effect to aesthetics.
5—Extreme; 80-100% affected; defoliation complete or nearly complete.

As shown in FIG. 14, in the Sep. 9, 2021 assessment, all rates and applications of flutriafol treatment performed better than or similar to Orkestra rotated with Torque early and the untreated control for average plant health. All rates and applications of flutriafol treatment performed better than or similar to Orkestra rotated with Torque early and the untreated control for average disease severity. All rates and applications of flutriafol treatment performed better than or similar to Orkestra rotated with Torque early and the untreated control for average defoliation. All rates and applications of flutriafol treatment performed better than or similar to Orkestra rotated with Torque early and the untreated control for average number of spots.

The best performance for average plant health was seen in the second rate (5 ml/DBH) applied in the spring, followed closely by the first rate (10 ml/DBH) applied in the spring. The best performance for average disease severity was application of the first rate (10 ml/DBH) in the fall and application of the second rate (5 ml/DBH) in the spring, followed closely by application of the first rate (10 ml/DBH) in the spring. The best performance in average defoliation was tied with application of the first rate (10 ml/DBH) in the fall and application of the second rate (5 ml/DBH) in the spring and application of the first rate (10 ml/DBH) in the spring. The best performance for average number of spots was the second rate (5 ml/DBH) applied twice in the spring, followed by the first rate (10 ml/DBH) applied in the spring.

As shown in FIG. 15, in the Sep. 23, 2021 assessment, all rates and applications of flutriafol treatment performed better than or similar to Orkestra rotated with Torque early and the untreated control for average plant health. All rates and applications of flutriafol treatment performed better than or similar to Orkestra rotated with Torque early and the untreated control for average disease severity. All rates and applications of flutriafol treatment performed better than or similar to Orkestra rotated with Torque early and the untreated control for average defoliation.

The best performance for average plant health was seen in application of the first rate (10 ml/DBH) in the spring, followed closely by application of the first rate (10 ml/DBH) applied in the fall and application of the second rate (5 ml/DBH) in the spring. The best performance for average disease severity was application of the first rate (10 ml/DBH) applied in the fall and application of the second rate (5 ml/DBH) in the spring, followed by application of the second rate (5 ml/DBH) twice in the spring. The best performance in average defoliation was application of the first rate (10 ml/DBH) in the fall, followed by application of the second rate (5 ml/DBH) in the spring and application of the first rate (10 ml/DBH) in the spring.

Figure 16:
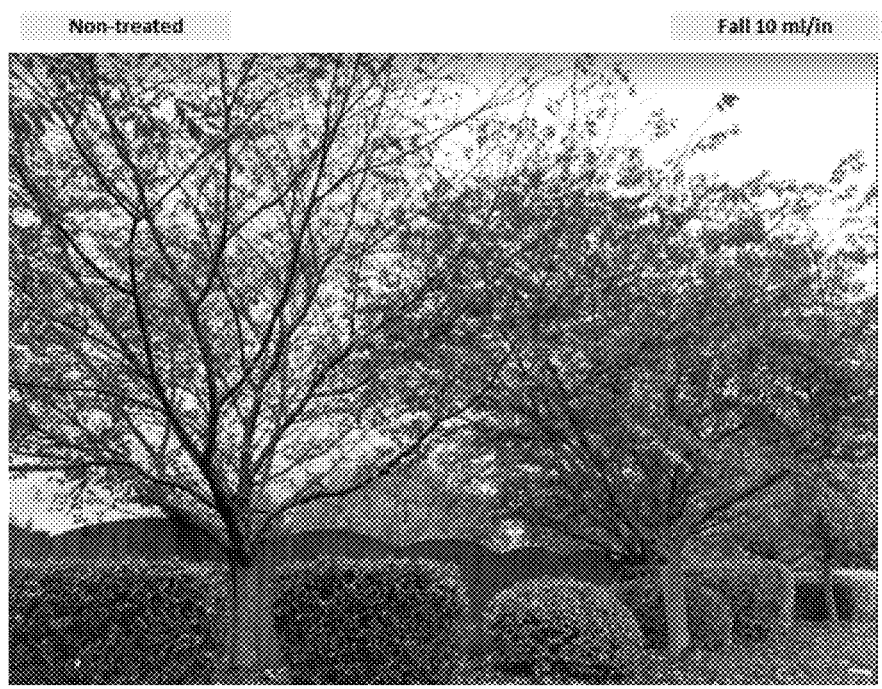
FIG. 16 is a photograph showing foliage of an untreated control tree versus a treated tree.
Figure 17A:
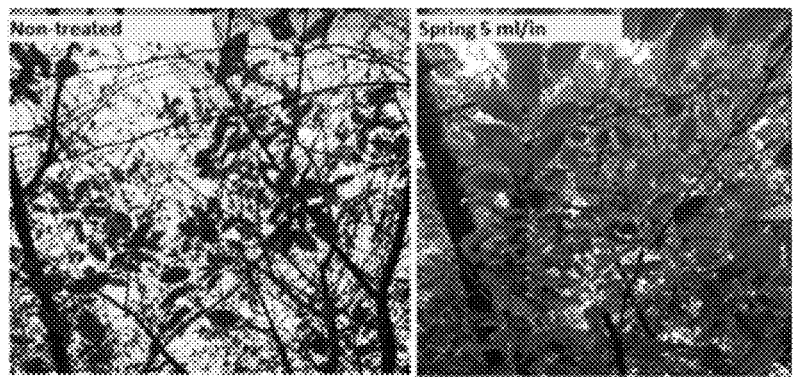
FIG. 17a is a photograph showing foliage of an untreated control tree versus a treated tree.
Figure 17B:
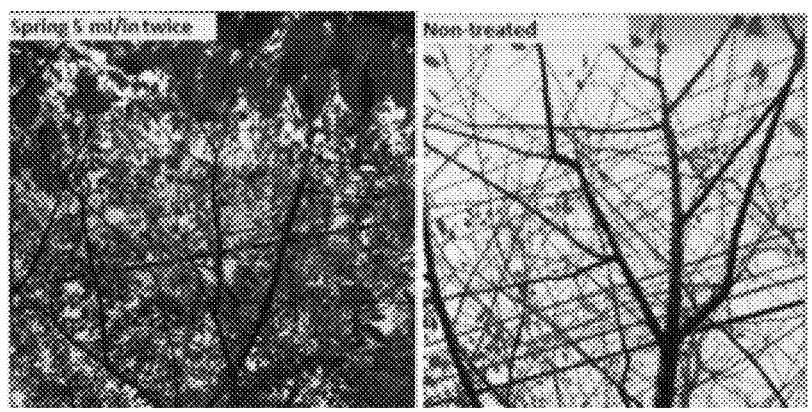
FIG. 17b is a photograph showing foliage of an untreated control tree versus a treated tree.

FIG. 16 is a photograph showing foliage of an untreated control tree (left) versus a treated tree (right). The treated tree was treated in the fall with 10 ml/DBH inch. As shown, the treated tree had significantly more foliage. FIG. 17a is a photograph showing foliage of an untreated control tree (left) versus a treated tree (right). The treated tree was treated in the spring with 5 ml/inch. FIG. 17b is a photograph showing foliage of an untreated control tree (right) versus a treated tree (left). The treated tree was treated in the spring with 10 ml/inch.

Study 3

A trial was performed looking at rates of the disclosed treatment to control apple scab on crabapple trees. This trial evaluated and compared fall applications of three rates of flutriafol against industry standard foliar treatments for control of apple scab on crabapple trees. The trees treated comprised Malta spp. Snow Crab. The pathogen being controlled was apple scab (*Venturia inaequalis*). The trial was done in Hamburg, Pennsylvania starting in the Fall of 2020 and ending in September 2021.

The trial had a randomized design with five replicates per treatment. Each treatment was identified and marked with an ID tag. At least 5 replicates per variety with known documented and prior levels of scab disease evenly distributed amongst study trees.

Soil application was done using a motorized backpack sprayer and soil injector. The motorized backpack sprayer was from Maruyama, Toyko, Japan. The soil injector was an HTI 2000 soil injector from Rainbow Treecare, Minnetonka, MN.

Foliar application was done using a foliar spray via a motorized backpack sprayer and spray gun. The backpack sprayer was form Maruyuma, Tokyo, Japan. The spray gun was an MD-9 spray gun from Maruyama, Tokyo, Japan.

Foliar sprays via motorized backpack sprayer and JD-9 spray gun or equivalent pressurized spray system were performed.

Fall treatments were done in late fall (October-November) prior to ground freeze. Early spring treatments occurred as soon as ground thaw occurred (first soil treatments may coincide with first spray treatments).

Insecticide treatments were applied to all tree replicates as needed to maintain tree health and prevent foliar feeding damage from insects, such as Japanese beetles, that could compromise the trial's integrity.

FIG. 18 is a table showing treatment, rate, application method, and application timing of the study regarding treating apple scab on crabapple trees. As shown, treatment included flutriafol soil injection and Myclotect foliar spray. Additionally, an untreated control was assessed.

The study assessed a first rate of 10 ml/DBH inch delivered in 250 ml solution/DBH inch and a second rate of 5 ml/DBH inch delivered in 250 ml solution/DBH inch. The study looked at application in the fall and the spring. One grouping as treated with the first rate (10 ml/DBH) in the fall (November) of 2020. One grouping was treated with the second rate (5 ml/DBH) in the fall (November) of 2020 and the spring (April 1) of 2021. One grouping was treated with the second rate (5 ml/DBH) in the spring (April 1) of 2021. One grouping was treated with the first rate (5 ml/DBH) in the spring (April 1) of 2021. One group was treated with the second rate (5 ml/DBH) twice in the spring (April 1 and April 29) of 2021.

An evaluation was made 2 WAT to assess potential phytotoxicity symptoms if leaves are present. Percent defoliation was evaluated in September and October 22021 to evaluate disease presence and progression in trees. Statistical analyses were conducted using R. A one-way and two-way ANOVA was used to evaluate the effect of treatment and time on quality ratings in the trees.

FIG. 19 is a table with results from Sep. 20, 2021 and Oct. 7, 2021. As shown, the best performance at the Sep. 20, 2021 assessment was the second rate (5 ml/DBH) applied in the fall and the spring, followed by the first rate (10 ml/DBH) applied in the fall. The best performance at the Oct. 7, 2021 assessment was the first rate (10 ml/DBH) applied in the fall, followed by the second rate (5 ml/DBH) applied in the fall and the spring.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A method of treating, controlling, or preventing foliar disease in established trees or shrubs, the method comprising:
applying a treatment composition to the soil around an established tree or shrub, the treatment composition comprising 0.25 to 5 g ai flutriafol per foot of shrub height or 1.25 to 5 g ai per inch of trunk diameter at breast height, wherein flutriafol is the only fungicide present in the treatment composition.

2. The method of claim 1, wherein the unit of treatment composition is between 50 ml and 1 gallon per foot of shrub height or inch of trunk diameter at breast height.

3. The method of claim 1, wherein applying the treatment composition comprises drenching the soil with the treatment composition.

4. The method of claim 1, wherein applying the treatment composition comprises injecting the soil with the treatment composition.

5. The method of claim 1, wherein applying the treatment composition is done in the spring.

6. The method of claim 1, wherein applying the treatment composition is done in the fall.

7. A method of treating, controlling, or preventing foliar disease in established trees or shrubs, the method comprising:
treating an established tree or shrub with a soil application of a flutriafol treatment composition comprising 500 g/l flutriafol, wherein the flutriafol treatment composition is delivered at a rate;
wherein the flutriafol composition is applied as a soil drench or injected into the soil, wherein flutriafol is the only fungicide present in the treatment composition.

8. The method of claim 7, wherein the rate is 2.5 ml/DBH inch to 10 ml/DBH inch.

9. The method of claim 8, wherein the flutriafol treatment composition is delivered in the fall.

10. The method of claim 8, wherein the flutriafol treatment composition is delivered in the spring.

11. The method of claim 7, wherein the rate is 0.5 ml to 10 ml.

12. The method of claim 11, wherein the flutriafol treatment composition is delivered in the fall.

13. The method of claim 11, wherein the flutriafol treatment composition is delivered in the spring.

14. The method of claim 7, wherein the flutriafol treatment composition is delivered in a first time in the fall and a second time in the spring, and wherein the rate is a first rate when the flutriafol treatment composition is delivered in the fall and a second rate when the flutriafol treatment composition is delivered in the spring.

15. The method of claim 14, wherein the first rate is 10 ml/DBH inch delivered in 250 ml solution/DBH and the second rate is 5 ml/DBH inch delivered in 250 ml solution/DBH.

16. The method of claim 7, wherein the flutriafol treatment composition is delivered a first time in the spring and a second time in the spring.

* * * * *